United States Patent
Oloman et al.

(10) Patent No.: US 10,233,552 B2
(45) Date of Patent: Mar. 19, 2019

(54) APPARATUS AND METHOD FOR FEEDING A MULTI-PHASE MIXTURE OF REACTANTS TO AN ELECTROCHEMICAL REACTOR

(71) Applicants: Colin Oloman, Vancouver (CA); Amin Aziznia, Vancouver (CA); Elod Gyenge, Vancouver (CA)

(72) Inventors: Colin Oloman, Vancouver (CA); Amin Aziznia, Vancouver (CA); Elod Gyenge, Vancouver (CA)

(73) Assignee: 0798465 B.C. LTD., Vancouver (CA)

( * ) Notice: Subject to any disclaimer, the term of this patent is extended or adjusted under 35 U.S.C. 154(b) by 110 days.

(21) Appl. No.: 14/913,292

(22) PCT Filed: Aug. 22, 2014

(86) PCT No.: PCT/CA2014/050808
§ 371 (c)(1),
(2) Date: Feb. 19, 2016

(87) PCT Pub. No.: WO2015/024132
PCT Pub. Date: Feb. 26, 2015

(65) Prior Publication Data
US 2016/0201207 A1 Jul. 14, 2016

Related U.S. Application Data

(60) Provisional application No. 61/869,053, filed on Aug. 22, 2013.

(51) Int. Cl.
| | |
|---|---|
| *H01M 8/04* | (2016.01) |
| *C25B 15/08* | (2006.01) |
| *C25B 9/08* | (2006.01) |
| *H01M 8/02* | (2016.01) |
| *H01M 8/1006* | (2016.01) |
| *H01M 8/1009* | (2016.01) |
| *H01M 8/241* | (2016.01) |

(Continued)

(52) U.S. Cl.
CPC ........... *C25B 15/08* (2013.01); *C25B 9/08* (2013.01); *H01M 8/02* (2013.01); *H01M 8/04186* (2013.01); *H01M 8/04201* (2013.01); *H01M 8/1006* (2013.01); *H01M 8/1009* (2013.01); *H01M 8/24* (2013.01); *H01M 8/241* (2013.01); *H01M 8/2455* (2013.01); *H01M 8/2465* (2013.01)

(58) Field of Classification Search
CPC ..................................................... H01M 8/04
See application file for complete search history.

(56) References Cited

U.S. PATENT DOCUMENTS

| | | |
|---|---|---|
| 7,530,477 B2 | 5/2009 | Ophardt |
| 7,714,274 B2 | 5/2010 | Degertekin et al. |

(Continued)

FOREIGN PATENT DOCUMENTS

WO   WO 2013/002893 A1   1/2013

*Primary Examiner* — Jacob B Marks (57) ABSTRACT

This invention is a method and apparatus for operating electrochemical reactors with multi-phase feeds, in which a liquid feed stream is dispersed in a second fluid to form a spray, mist or emulsion before entering the reaction zone. The invention is applicable to both electro-synthesis and fuel cell reactors, with particular utility in mixed-reactant fuel cells.

10 Claims, 10 Drawing Sheets

Conventional divided cell electrochemical reactor with reactants in parallel flow (51) Int. Cl.
*H01M 8/2455* (2016.01)
*H01M 8/2465* (2016.01)
*H01M 8/24* (2016.01)
*H01M 8/04186* (2016.01)
*H01M 8/04082* (2016.01)

(56) References Cited

U.S. PATENT DOCUMENTS

| | | |
|---|---|---|
| 7,736,784 B2 | 6/2010 | Son |
| 8,124,296 B1 | 2/2012 | Fischhel |
| 2005/0019623 A1* | 1/2005 | Shoji ............... B01F 5/0682 48/198.7 |
| 2007/0231650 A1* | 10/2007 | Jiang ............... H01M 4/8631 429/425 |
| 2009/0130510 A1* | 5/2009 | Ishikawa ........... H01M 8/04089 429/411 |

* cited by examiner

Figure 1

Conventional divided cell electrochemical reactor with reactants in parallel flow

Figure 2

Electrochemical reactor with mixed-reactants to cells in series flow.

Figure 3

Swiss-roll electrochemical reactor with reactants to cells in parallel flow

Figure 4

Swiss-roll electrochemical reactor with immiscible liquid reactants to cells in parallel flow

Figure 5

Swiss-roll electrochemical reactor with immiscible liquid reactants and dispersing gas, to cells in parallel flow

Figure 6

Experimental set up for the Swiss-roll mixed-reactant fuel cell electrochemical reactor

Figure 7

Effect of (a) temperature and (b) oxidant at 323 K on the SWMRFC without feed sprayer nozzle, , single cell, Feed: 1 M NaBH$_4$+2 M NaOH (12 mL/min), O$_2$ (10 L/min, STP), cathode: MnO$_2$/C, Separator: one layer of Scimat® 720/20.

Figure 8

(a) Effect of (a) temperature and (b) oxidant at 323 K on the SWMRFC performance with feed sprayer nozzle, single cell, Feed: 1 M NaBH$_4$+2 M NaOH (12 mL/min), O$_2$ (10 L/min, STP), cathode: MnO$_2$/C, Separator: one layer of Scimat® 720/20.

Figure 9

Polarization and superficial power density for a 20 cm² single cell SR-MRFC with and without presence of the sprayer nozzle.

Separator: one layer of Scimat® 720/20. Pt/C anode, $MnO_2$/C cathode, feed: 1 M $NaBH_4$+2 M NaOH (12 mL/min), $O_2$ (10 SL/min), 323 K, 105 kPa(abs).

Figure 10

Polarization and superficial power density for a single cell SR-MRFC

Separator: one layer of Scimat® 720/20. PtRu/C anode, MnO$_2$/C cathode, fuel: 1 M CH$_3$OH +2 M NaOH 12 mL/min, oxidant: N$_2$O 10 SL/min  323 K, P=105 kPa (abs), geometrical surface area: 20 cm$^2$

Figure 11

Configuration of the bipolar SRMRFC with 3-cells in series.

Figure 12

Polarization and superficial power density for a multi-cell bipolar SR-MRFC with sprayer nozzle feed.

Separator: one layer of Scimat® 720/20. Pt/C anode, $MnO_2$/C cathode, feed: 0.5 M $NaBH_4$+ 2 M NaOH (12 mL/min), $O_2$ (10 SL/min), 323 K, 105 kPa(abs). Geometrical surface area per cell: 20 $cm^2$

APPARATUS AND METHOD FOR FEEDING A MULTI-PHASE MIXTURE OF REACTANTS TO AN ELECTROCHEMICAL REACTOR

FIELD OF THE INVENTION

This invention concerns the design and operation of electrochemical reactors for electro-synthesis (electro-synthesis reactors) or for the generation of electricity in fuel cells (fuel cell reactors), by electrochemical reaction between fuel(s) and oxidant(s)—collectively called the fuel cell reactants. In particular, this invention relates to electrochemical reactors in which at least one reactant is fed to the reactor in the liquid phase. More specifically this invention is preferably applied to continuous mixed-reactant fuel cell reactors, in which the reactants are fed to the reactor in a single mixed stream and/or enter the reaction zone as a mixture of fuel and oxidant.

BACKGROUND OF THE INVENTION

Electrochemical reactors are devices used to effect the transfer of energy between electricity and matter. These reactors may consist of single electrochemical cells, each with an anode and complimentary cathode, or multiple single cells electrically connected together in series (bipolar mode) or in parallel (monopolar mode). Further, in continuous electrochemical reactors the fluid reactants may be manifolded to flow through multiple cells in series or in parallel.

Electro-chemical processes frequently involve continuous electrochemical reactors using multi-phase reactants that should be intimately contacted in the reactor to obtain high process efficiencies. These processes include gas/liquid (G/L) systems in which reactants are fed to the reactor in the gas and liquid phases, as well as those involving liquid/liquid (L/L) systems, where reactants are fed to the reactor in two immiscible (i.e. mutually insoluble) liquid phases.

A so-called "fuel cell" is a single or multi-cell electrochemical reactor used to convert chemical energy to electricity. With respect to fuel cells, a conventional continuous fuel cell reactor has the fuel and the oxidant fed to the reactor in separate streams that are kept apart in the reactor by separators, typically consisting of an ionically conductive ion selective membrane or porous diaphragm that divides each electrochemical cell into anode and cathode compartments. In such a reactor a multiplicity of single cells may be sized and stacked electrically in series to obtain a desired DC voltage and power output, while the gaseous and/or liquid reactants may flow in series or, preferably, are manifolded in parallel to the cells.

Contrarily, in a continuous mixed-reactant fuel cell (MRFC) reactor there may or may not be separate anode and cathode compartments and the gaseous and/or liquid reactants are in one stream that flows in series or in parallel through the cells. Mixed-reactant fuel cells have potential commercial advantages over conventional fuel cells because they have fewer components and a more simple balance of plant.

In multi-phase electro-synthesis processes (continuous electro-synthesis reactors) the reactants are typically fed to the continuous reactor in separate streams, or via an in-line mixer that disperses one of the phases before entering the reactor. The performance of such processes depends in part on the manner of mixing the feed reactants, which in turn affects the fluid dynamics of the multi-phase flow inside the reactor.

Similarly, for both the conventional and mixed-reactant fuel cell continuous reactors known in the art, the reactants are fed to the reactor in separate conduits (e.g. tubes) or are mixed in a single conduit before entering the reactor. In the case of an MRFC with a liquid reactant, the reactant mixture could potentially be a single phase liquid, a two phase gas/liquid or liquid/liquid or a three-phase combination of gas and two liquids. In the latter two cases (i.e. MRFC 2-phase or 3-phase) the selectivity of electrode reactions and consequent performance of the fuel cell depends in part on the fluid dynamics in the reactor and the uniformity of the reactant mixture. Similarly the performance of a conventional fuel cell with a liquid reactant may depend in part on fluid dynamics in the electrode compartments that affect the contact of the reactant(s) with the solid electrodes.

In the present context, the performance of a continuous electro-synthesis reactor is determined by one or more of the current density ($A/m^2$), selectivity (%) and specific energy consumption (Wh/kg of product). Alternatively, the performance of a fuel cell continuous reactor is measured by one or more of the voltage efficiency (%), Faradaic efficiency (%), energy efficiency (%), superficial power density (W/m2), and the volumetric or gravimetric power density ($W/m^3$ or W/kg). As a rule, "improving" the reactor performance means increasing the values of these performance indicators, with the objective of decreasing the total cost per unit of material or energy output (respectively $/kg and $/J), where the total cost is the sum of the capital and operating costs.

SUMMARY OF THE INVENTION

The present invention provides a means to enhance the performance of continuous electrochemical reactors by dispersing the multi-phase fluid feeds in the feed stream and/or reactive zone of the reactor. This dispersion may be obtained by various fluid contacting devices, such as spray nozzles, in-line mixers, and the like as known in the prior art. In the case of a gas/liquid system (e.g. a liquid fuel or oxidant with a gaseous oxidant, fuel or non-reactant) this dispersion is preferably obtained by a spray nozzle producing droplets of liquid dispersed in the gas (L/G)—preferably in the form of a mist, in which the mean droplet diameter is below about 10 microns. In the case of a liquid/liquid system (e.g. a liquid fuel or oxidant with an immiscible liquid oxidant or fuel) the dispersion may be obtained by a mixing nozzle, in-line mixer, or the like which generates liquid droplets dispersed in a liquid (L/L), preferably in the form of an emulsion with the mean droplet diameter below about 100 microns. The fluid contacting (dispersing) device may optionally be located outside or inside the reactor, the chief requirement being that the liquid feed (fuel or oxidant) enters the corresponding reaction zone as a fluid/fluid dispersion.

In the case of fuel cell reactors with ion-selective separators (e.g. proton exchange membrane=PEM) the reactant dispersion may or may not contain an ionically conductive liquid (i.e. an electrolyte solution), whereas with porous diaphragm separators the reactant dispersion should include an ionically conductive liquid. In the case of L/L dispersions one of the liquids, preferably the continuous phase, may have a low or zero ionic conductivity.

In some aspects, the present invention provides a method of operating an electrochemical reactor having a reaction zone, the method comprising the step of dispersing a liquid reactant in a gas or liquid as it enters said reaction zone of the reactor.

In some embodiments, the electrochemical reactor is a continuous electro-synthesis reactor or a continuous fuel cell reactor. The continuous fuel cell reactor may be a continuous mixed reactant fuel cell reactor or a continuous Swiss roll mixed reactant fuel cell reactor.

In another aspect, the invention comprises dispersing the liquid reactant in the gas to form a spray or mist, with the spray or mist entering the reaction zone of the reactor. A dispersal device such as a spray nozzle, mixing apparatus of an in-line mixer may be used.

In another embodiment, the invention comprises an apparatus for operating an electrochemical reactor that includes a dispersal device for dispersing a liquid reactant in either a gas to form a spray or mist, or in a liquid to form an emulsion, said spray, mist or emulsion being fed into a reaction zone of the reactor. The dispersal device can be a spray nozzle, a mixing nozzle or an in-line mixer.

In another embodiment, the reactor comprises a continuous Swiss-roll mixed reactant fuel cell reactor, wherein the gas and the liquid are immiscible with the liquid reactant such that when the liquid reactant is dispersed in the gas or liquid an emulsion is formed, with the emulsion entering the reaction zone of the reactor.

In another embodiment the invention comprises an electrochemical reactor having a reaction zone and further comprising a spray nozzle for dispersing a liquid reactant in a gas to form a spray or mist that is fed into the reaction zone. The electrochemical reactor comprises either a continuous electro-synthesis reactor or a continuous fuel cell reactor.

In another embodiment, the invention comprises use of a dispersal device to disperse a liquid reactant in a gas or liquid to form a spray or mist or emulsion that is fed into a reaction zone of an electrochemical reactor. The dispersal device may be a spray nozzle, a mixing nozzle or an in-line mixer.

In another embodiment, the electrochemical reactor is a multi-cell reactor. In another aspect, the multi-cell reactor comprises either single cells, monopolar cell stacks, or bipolar cell stacks with adjacent single cells, monopolar cell stacks or bipolar cell stacks respectively.

In another aspect, the multi-cell reactor has an electrode arrangement comprising at least two sandwich arrangements, each sandwich arrangement comprising at least two deformable electrodes, first insulating means for preventing electronic contact between said at least two electrodes and second insulating means for preventing electronic contact between one of said at least two deformable electrodes and other conducting parts of the reactor. The at least two sandwich arrangements are rolled around an axis in spaced separation from one another inside an electronically conductive cylinder. The axis and the cylinder are both longitudinally segmented by electronic insulators to allow for bipolar operation of cells of the reactor.

In another embodiment the invention comprises a rolled mixed reactant fuel cell stack wherein the stack comprises a plurality of single cells connected either in series or in parallel, each of the plurality of single cells being rolled around a central axis. The central axis is defined by a mandrel. In another aspect, reactant is fed to a reaction zone of the stack by a dispersal device.

In yet a further embodiment, the invention comprises an electrode arrangement for an electrochemical reactor comprising at least two sandwich arrangements, each sandwich arrangement comprising at least two deformable electrodes, first insulating means for preventing electronic contact between the at least two electrodes and second insulating means for preventing electronic contact between one of the deformable electrodes and other conducting parts of the reactor. The sandwich arrangements are rolled around an axis in spaced separation from one another inside an electronically conductive cylinder. The axis and the cylinder are both longitudinally segmented by electronic insulators to allow for bipolar operation of cells of the reactor. In another aspect, the reactor further comprises a dispersal device for feeding reactants to a reaction zone within said reactor.

Objects of the invention will be apparent from the description that follows.

BRIEF DESCRIPTION OF THE DRAWINGS

These and other features of the invention will become more apparent from the following description in which reference is made to the appended drawings and wherein.

DETAILED DESCRIPTION OF THE INVENTION

The preferred embodiments relate to continuous electrochemical reactors used to generate electricity—so-called "fuel cells" and to continuous electrochemical reactors used for the electro-synthesis of chemicals.

In fuel cell applications the fuel and oxidant reactants are in separate phases, with fuel in a liquid phase and oxidant in a gas phase, or vice-versa, or with fuel and oxidant respectively in immiscible liquid phases.

Liquid phase fuels may be water soluble inorganic compounds such as ammonia, hydrazine and sodium borohydride, as well as organics, such as methanol, ethanol, propanol, ethylene glycol, glycerol, formic acid, sodium formate, formaldehyde, urea, dimethyl ether and the C4 to C8 alkanes and aliphatic alcohols. In general the fuels should have an electrochemical redox potential below about −0.5 Volt relative to a corresponding oxidant and preferably an electro-oxidation standard exchange current density above about 1E-3 A/m$^2$ at 25° C. on an appropriate electrocatalyst.

Liquid phase oxidants may be water soluble inorganic compounds such as hydrogen peroxide, persalts and metal ions in high valence state such as Fe(III), V(IV) and Cr(VI), as well as organics such as dimethyl dioxyrane and organoperacids and peroxides that are soluble in water and/or non-aqueous solvents. Liquid phase oxidants can include solutions of gas phase oxidants in organic solvents such as octane and perfluorinated hydr(oxy)carbons. In general the oxidants should have an electrochemical redox potential above about 0.5 Volt, relative to a corresponding fuel and preferably an electro-reduction standard exchange current density above about 1E-3 A/m$^2$ at 25° C. on an appropriate electrocatalyst.

In the case of liquid reactants the terms "reactant" "fuel" and "oxidant" are intended here to apply to both the pure reactants and to their solutions in aqueous or non-aqueous media, which may also contain non-reactive electrolytes.

Gas phase fuels may be gases or vapours such as hydrogen, ammonia, hydrocarbons such as methane, ethane, and the like, sulphur dioxide and volatile organics such as those listed above for liquid fuels.

Exemplary gas phase oxidants are chlorine, nitrous oxide, nitrogen dioxide, oxygen and ozone.

In general a gas phase fuel or oxidant should have an electrochemical redox potential respectively below 0.5 Volt and above 0.5 Volt relative to a corresponding counter reactant, preferably with a standard exchange current density for electrooxidation or electro-reduction on an appropriate electrocatalyst above about 1E-3 A/m$^2$ at 25° C.

Non-reactive gases can be, for example, nitrogen, carbon dioxide or in some cases, air.

Appropriate electrocatalysts include those well known in the prior art, for example:
 for fuels—platinum, ruthenium, palladium, osmium, nickel and perovskites with associated transition metals.
 for oxidants—platinum, gold, silver, transition metal oxides, perovskites and macrocyclic organo-metal compounds such as cobalt and iron porphyrins and phthalocyanines.

Figure 1:
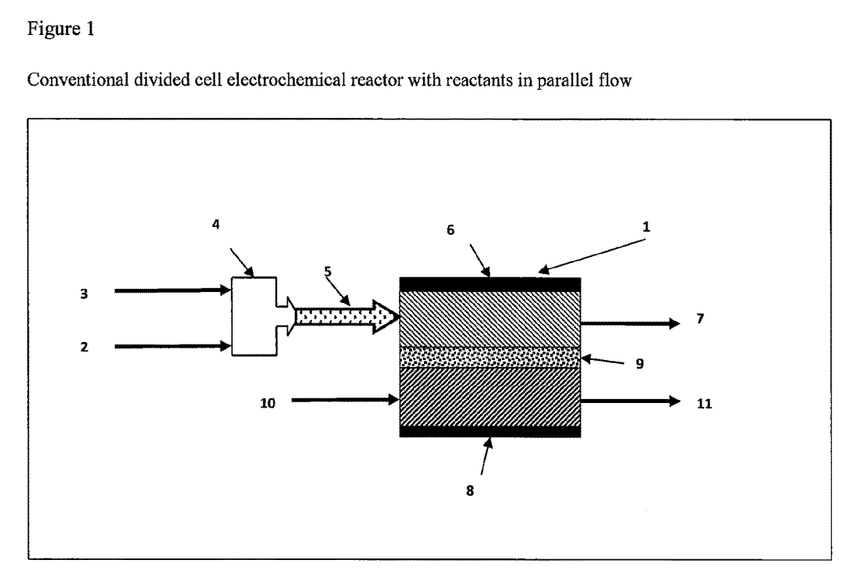
FIG. 1 shows a conventional continuous single-cell electrochemical reactor with separate anode and cathode compartments, fed with a liquid reactant dispersed in a non-reactive gas.

Considering the application of this invention to fuel cell (continuous) electrochemical reactors:

FIG. 1 shows a conventional fuel cell [1] in which the liquid fuel or oxidant [2] is contacted with a non-reactive gas [3] in spray nozzle [4] to form a gas/liquid dispersion [5] that enters (respectively) the anode or cathode chamber [6] and leaves in product stream [7]. The anode or cathode chamber [6] is electronically isolated from the corresponding cathode or anode chamber [8] by an ion conducting separator [9], positioned to prevent contact between the supporting oxidant or fuel [10], which leaves in product stream [11].

Figure 2:
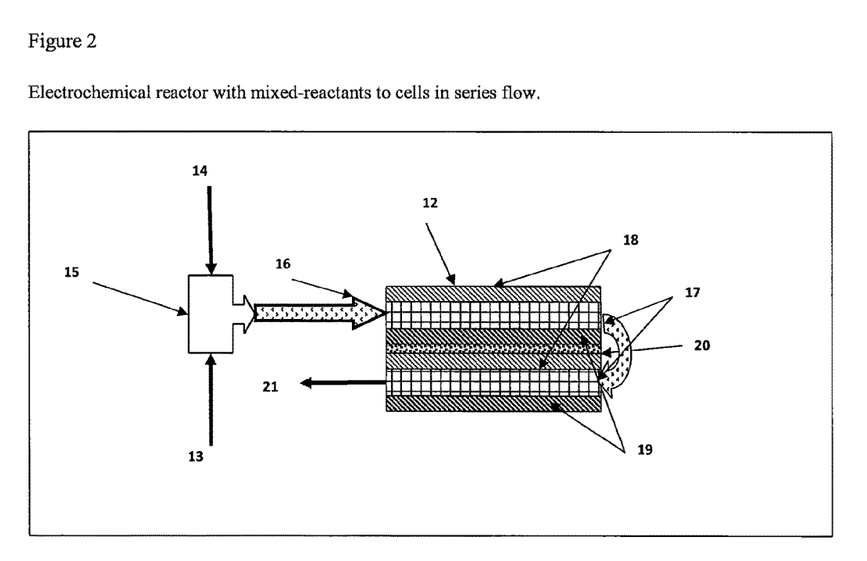
FIG. 2 shows a continuous electrochemical reactor with multiple parallel plate cells operating in series with respect to fluid flow. In this case a reactant liquid is dispersed into gas in the mixed feed stream entering the reactor and flows through porous fluid distributors that provide the electronic contact between adjacent bipolar cells.

FIG. 2 shows an unconventional mixed-reactant fuel cell [12] such as that described in Oloman, C., "Mixed-reactant flow-by fuel cell", GB2474202B 18 Jul. 2012. Here the liquid fuel or oxidant [13] is contacted with a complimentary gas oxidant or fuel [14] in a spray nozzle [15] and the gas/liquid dispersion [16] enters and passes through the fuel cell [12] via a porous fluid distributor [17] providing electronic contact between electrodes [18] and counter-electrodes [19] in adjacent electrochemical cells. In each electrochemical cell the electrode (anode or cathode) [18] is electronically isolated from the corresponding counter-electrode (cathode or anode) by an ionically conducting separator [20] and the mixed reaction products leave the reactor in the product stream [21].

Figure 3:
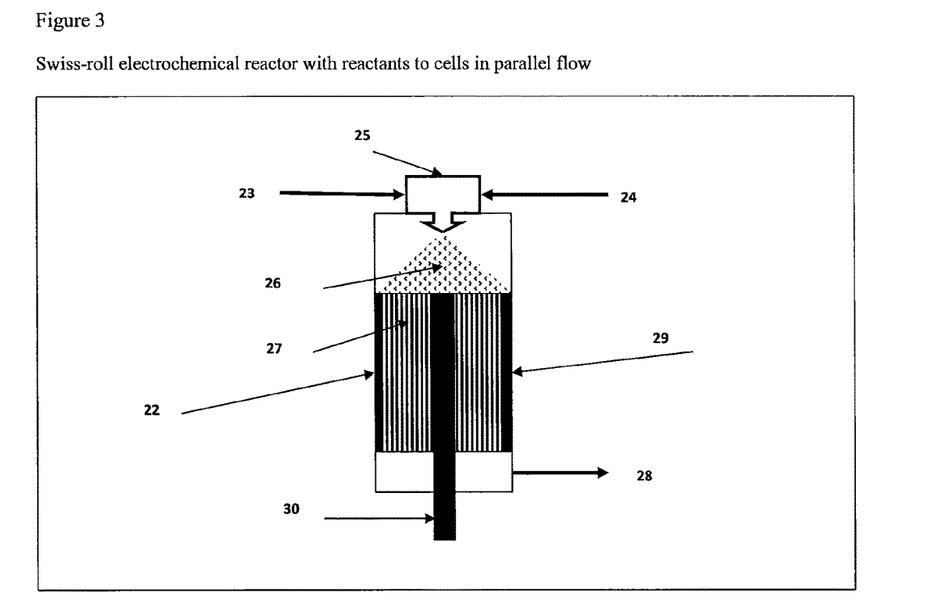
FIG. 3 shows a continuous cylindrical Swiss-roll electrochemical reactor, where a reactant liquid is dispersed into the top of the reactor body, using a spray nozzle driven by a reactant gas. The reactant fluids (liquid and gas) then flow in parallel through the fluid distributor(s) of a single cell or of multiple bipolar cells wound on a central mandrel.

FIG. 3 illustrates an unconventional cylindrical Swiss-roll mixed-reactant fuel cell [22] such as that described in Aziznia, A., Oloman, C., Gyenge, E., "A Swiss-roll mixed-reactant fuel cell", J.Power Sources, 212,(2012),154-160. Here the liquid fuel or oxidant [23] is contacted with a complimentary gas oxidant or fuel [24] in a spray nozzle [25] and the gas/liquid dispersion [26] enters and passes through the fuel cell spool [27] to leave the reactor as a mixed reaction product in the product stream [28]. The gas to liquid volumetric ratio of the gas to liquid dispersion [26] may be in the range of about 10 to 1000. The spooled cells have flexible components that are assembled as in FIG. 1 or FIG. 2, with an electrode, counter-electrode, electronically conductive porous fluid distributor and ionically conductive separator. Electric current is drawn from the reactor by the electronically conductive outer tube wall [29] and central mandrel [30], respectively in contact with the electrode and counter-electrode.

Figure 4:
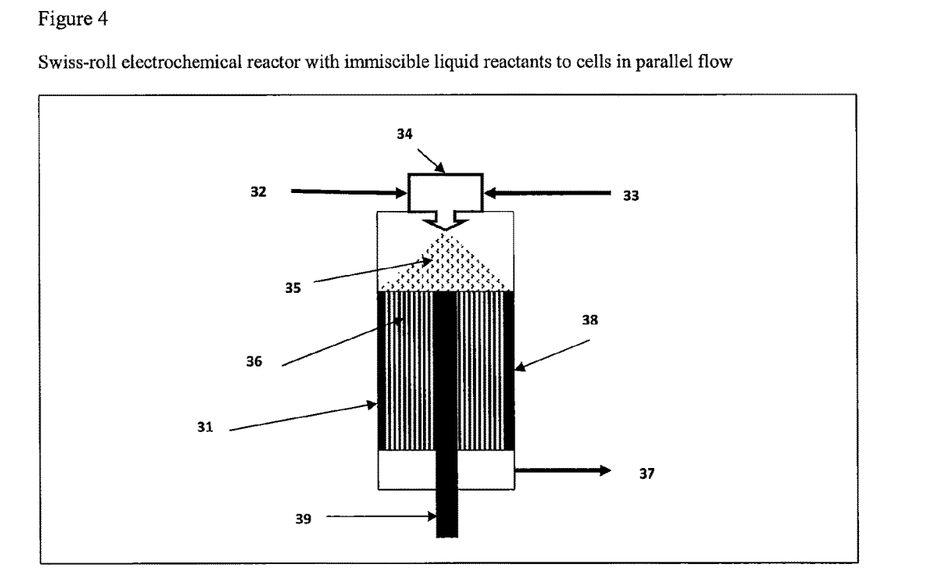
FIG. 4 shows a variation of FIG. 3 in which both reactants are fed to the reactor as liquids that are mutually immiscible.

FIG. 4 shows a Swiss-roll mixed-reactant fuel cell [31] where the liquid fuel or oxidant [32] is contacted with a complimentary immiscible ("immiscible" means mutually insoluble) liquid oxidant or fuel [33] in a spray nozzle [34] and the liquid/liquid dispersion [35] enters and passes through the fuel cell spool [36] to leave the reactor in the product stream [37]. The spooled cells have flexible components that are assembled as in FIG. 1 or FIG. 2, with an electrode, counter-electrode, electronically conductive porous fluid distributor and ionically conductive separator. Electric current is drawn from the reactor by the electronically conductive outer tube wall [38] and central mandrel [39], respectively in contact with the electrode and counter-electrode.

Figure 5:
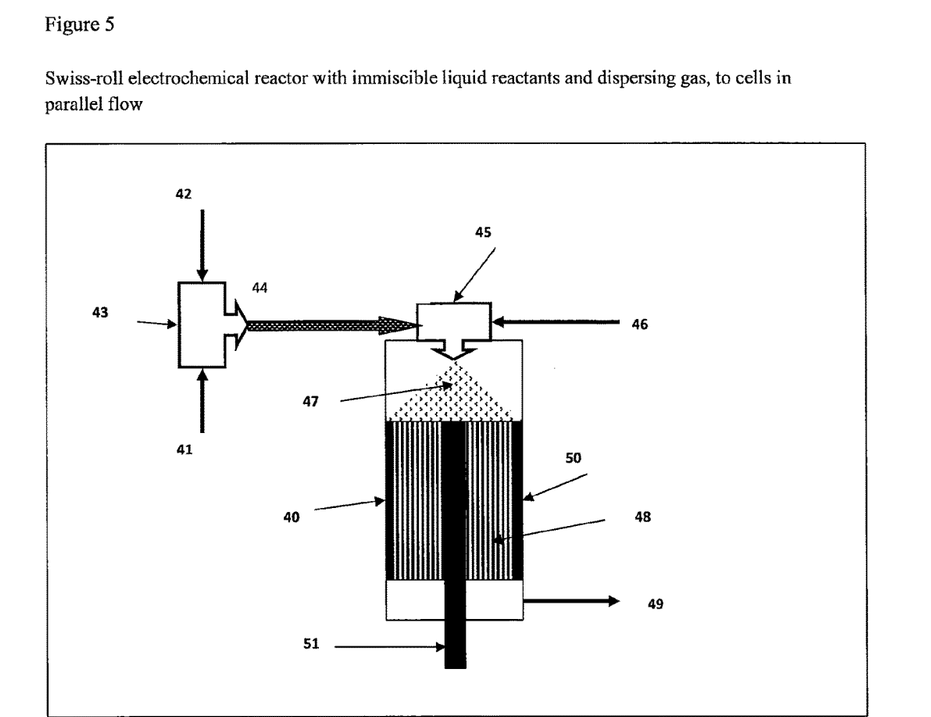
FIG. 5 shows a combination of FIGS. 3 and 4 involving a three-phase fluid (L/L/G) system. Here the immiscible liquid reactant(s), optionally with a non-reactive liquid carrier, are premixed to form a L/L dispersion (e.g. an emulsion) then flow to a gas/liquid nozzle for delivery as a spray to the electrochemical reactor.

FIG. 5 represents a Swiss-roll mixed-reactant fuel cell [40] where a liquid fuel or oxidant [41] is contacted with an immiscible liquid oxidant or fuel [42] in a liquid/liquid contacting device [43] to form a liquid/liquid dispersion [44] which is subsequently contacted with a reactive or non-reactive gas [45] in spray nozzle [46] to form a gas/liquid dispersion [47] that enters and passes through the fuel cell spool [48] to leave the reactor in the product stream [49]. The spooled cells have flexible components that are assembled as in FIG. 1 or FIG. 2, with an electrode, counter-electrode, electronically conductive porous fluid distributor and ionically conductive separator. Electric current is drawn from the reactor by the electronically conductive outer tube wall [50] and central mandrel [51], respectively in contact with the electrode and counter-electrode.

In electro-synthesis applications FIGS. 1 to 5 illustrate how the appropriate dispersion of the reactor feed(s) may be used in processes with multi-phase reactants.

FIG. 1 shows a divided cell electro-synthesis reactor [1], where the liquid anode or cathode reactant [2] is contacted with a reactive or non-reactive gas [3] in a spray nozzle [4] to give a gas/liquid dispersion [5] that is fed to the anode or cathode [6] which is electronically isolated from the counter catholyte or anolyte [8] by an ionically conductive separator [9] and discharged in product stream [7]. The complimentary cathode or anode reactant feed [10] is discharged in product stream [11]. Such an arrangement may apply, for example, to the electro-reduction of sulphur dioxide (gas) to aqueous dithionite and to the electro-reduction of carbon dioxide (gas) to aqueous formate.

FIGS. 2 and 3 illustrate respectively parallel plate and Swiss-roll electrochemical reactors [12],[22] with undivided cells, where liquid reactants [13],[23] are contacted with reactant or non-reactant gases [14],[24] in spray nozzles [15],[25] to give gas/liquid dispersions [16],[26] that enter and pass through the reactors via porous fluid distributors [17] providing electronic contact between electrodes [18] and counter-electrodes [19] in adjacent electrochemical cells. In each electrochemical cell the electrode (anode or cathode) [18] is electronically isolated from the corresponding counter-electrode (cathode or anode) by an ionically conducting separator [20] and the mixed reaction products leave the reactors in the product streams [21],[28]. Electric current is fed to the reactors via electronically conductive contacts with the terminal electrodes [12],[29] and counter-electrodes [19],[30]. Such an arrangement may apply, for example, to operation with a single electrolyte in electro-synthesis reactors with undivided cells, such as in the production of adiponitrile from acrylonitrile and of peroxide by electro-reduction of oxygen.

FIGS. 4 and 5 represent the application of the present invention to electro-synthesis in liquid/liquid (L/L) systems.

FIG. 4 shows a Swiss-roll electrochemical reactor [31] where liquid reactant [32] is contacted with an immiscible liquid reactant or non-reactant [33] in a mixing nozzle and the consequent L/L dispersion [35] passes into and through coiled electrochemical cell(s) [36] into the product stream [37]. Electric current is fed to the reactor via electronically conductive contacts with the terminal electrode [38] and counter-electrode [39].

FIG. 5 shows a Swiss-roll electrochemical reactor [40] where a liquid reactant [41] is contacted with an immiscible liquid reactant or non-reactant [42] in mixing nozzle [43] and the consequent L/L dispersion [44] flows to spray nozzle [45] where it is contacted with a reactive or non-reactive gas [46]. The consequent gas/liquid/liquid (G/L/L) dispersion [47] passes into and through coiled electrochemical cell(s) [48] into the product stream [49]. Electric current is fed to the reactor via electronically conductive contacts with the terminal electrode [50] and counter-electrode [51].

The arrangements of FIGS. 4 and 5 may be applied, for example, in electro-synthetic processes such as the direct electro-reduction or electro-oxidation of organics (e.g. nitro-alkanes or aromatics) in aqueous acid, electrochemical organic halogenations and electrochemically mediated oxidation or reduction of organics, such as the oxidation of naphthalene to naphthaquinone via the Ce(IV)/Ce(III)(aq) redox couple. These reactions are carried out in L/L emulsions, generated, for example, by the L/L mixing nozzles in FIGS. 4 and 5. In some situations fine L/L emulsions are counterproductive due to the difficulty of the subsequent phase separation, but this problem may be relieved by the mixing nozzle design, respecting the drop size and phase/volume ratio.

The arrangements of FIGS. 4 and 5 may also be applied to electrochemical field-assisted separations; for example, in the separation of salty water from liquid organics by electrodialysis.

Figure 11:
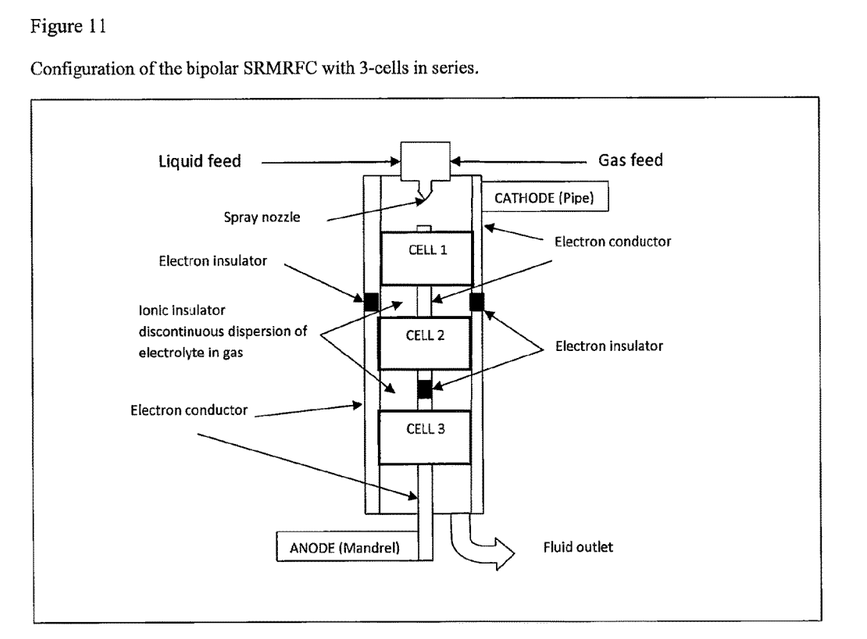
FIG. 11 shows the configuration of the bipolar Swiss-roll mixed reactant fuel cell electrochemical reactor with 3 cell rolls in series. In this case each cell roll may be a single cell (as in FIG. 1) or a multi-cell stack (as in FIG. 2) with electrodes and counter electrodes in electronic contact respectively with an electronically conductive mandrel and an electronically conductive external pipe which function as current collectors. Additionally, the reactor may be fed by a single fluid dispersion device (e.g. spray nozzle) or by multiple such devices, as required to distribute the reactants within the reactor.

A bipolar Swiss-roll mixed reactant fuel cell electrochemical reactor with 3 cell rolls in series is illustrated in FIG. 11. Each cell roll may be a single cell (as in FIG. 1) or a multi-cell stack (as in FIG. 2) with electrodes and counter electrodes in electronic contact respectively with an electronically conductive mandrel and an electronically conductive external pipe which function as current collectors. Additionally, the reactor may be fed by a single fluid dispersion device (e.g. spray nozzle) or by multiple such devices, as required to distribute the reactants within the reactor. The anodes of the individual [cells/stacks/bipolar stacks] are electronically connected to but ionically separated from the cathodes of adjacent [cells/stacks/bipolar stacks], as exemplified in FIG. 11. In Figure lithe ionic separation is done by the gaps between the cells 1, 2 and 3, in which the ionic conductor (i.e. electrolyte) should be discontinuous to prevent ionic conduction between the cells. That discontinuity is given by the 2-phase flow in which 1 phase (e.g. a gas) is an ionic insulator. Each "cell" in FIG. 11 can be a single cell roll (FIG. 1) or a multi-cell roll of bipolar cells (FIG. 2). The electronic insulators in FIG. 11 force the electric current to flow in series through the 3 cells, to set up the bipolar operation in which the total voltage between the external anode (bottom mandrel) and cathode (top pipe) is theoretically the sum of the individual cell voltages.

EXAMPLES

Figure 6:
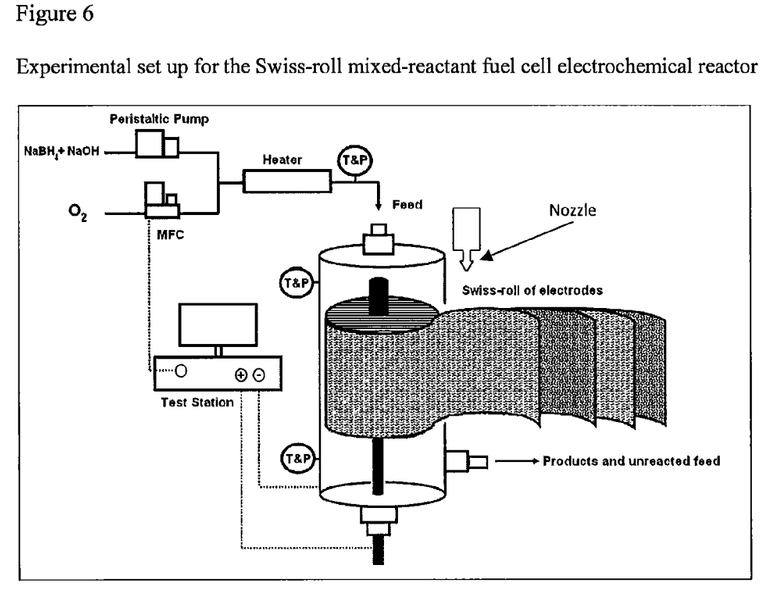
FIG. 6 shows the experimental set up for a Swiss-roll mixed reactant fuel cell electrochemical reactor.

As detailed in Aziznia et al., a continuous Swiss-roll mixed-reactant fuel cell (SRMRFC) reactor was set up as in FIG. 6, with a single monopolar cell having electrodes 20 mm wide by 100 mm long rolled onto a 10 mm diameter stainless steel mandrel and inserted in a 250 mm ID gold plated (inside) SS pipe. This reactor was operated with feed of liquid fuel [1 M $NaBH_4$(aq)+2 M NaOH(aq)], mixed with a gas oxidant ($O_2$(g)). Experimental results from this apparatus are given below in Examples 1, 2 and 3 (FIGS. 7,8,9 and 10). In another set of trials the SRMRFC was used in a multi-cell bipolar reactor, as described in Example 4 and shown in FIGS. 11 and 12.

Example 1

Figure 7:
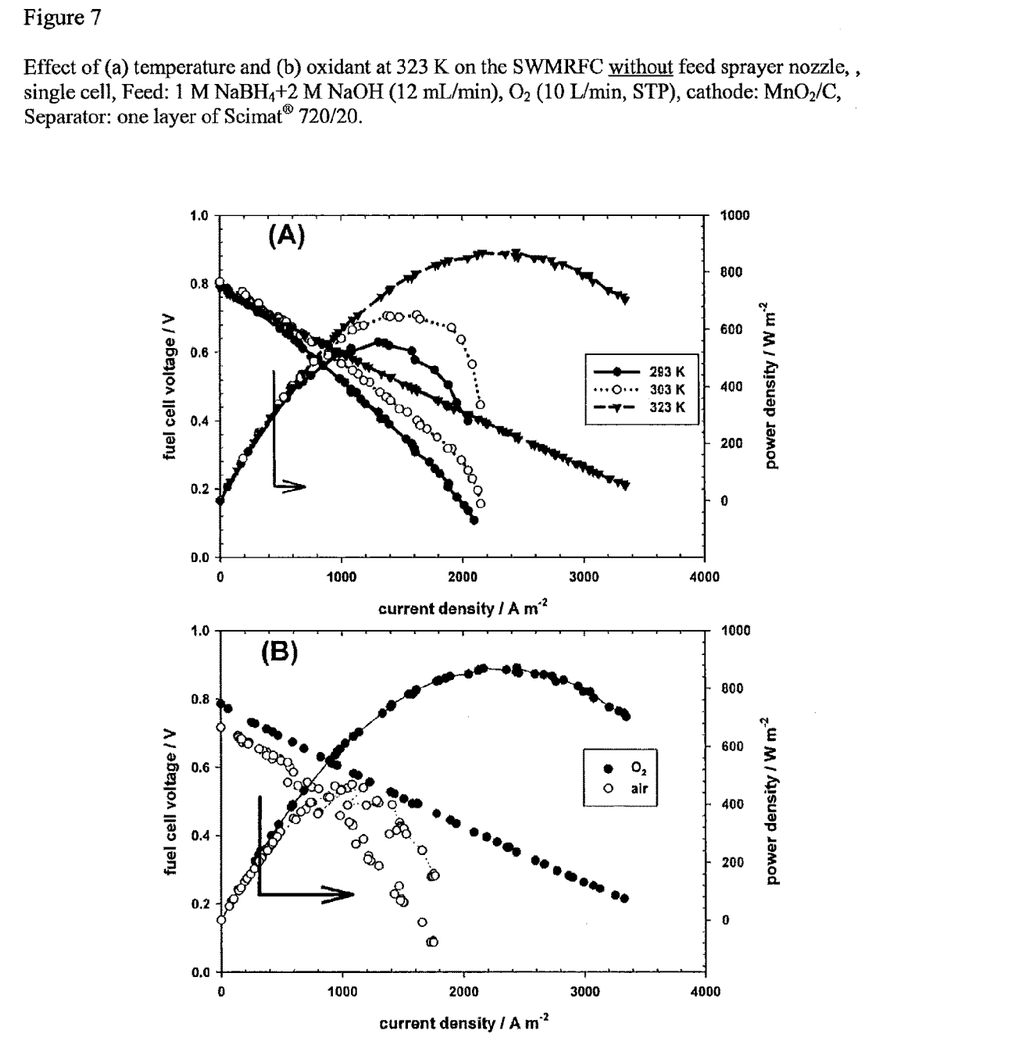
FIG. 7 is a graph showing the effect of temperature (A) and oxidant (B) on the Swiss-roll mixed reactant fuel cell electrochemical reactor without a feed sprayer nozzle.

Here the flowing liquid fuel and gas oxidant were mixed at a T junction and passed directly into the top of the reactor as a two-phase stream in a 3mm ID stainless steel tube protruding to about 50 mm above the top face (inlet) of the coiled cell. FIG. 7 shows performance curves for this reactor over a range of temperatures, using Pt/C anode catalysts coupled with an $MnO_2$/C cathode catalyst. The peak superficial power density measured here was about 871 W/m$^2$, at 323 K.

Example 2

Figure 8:
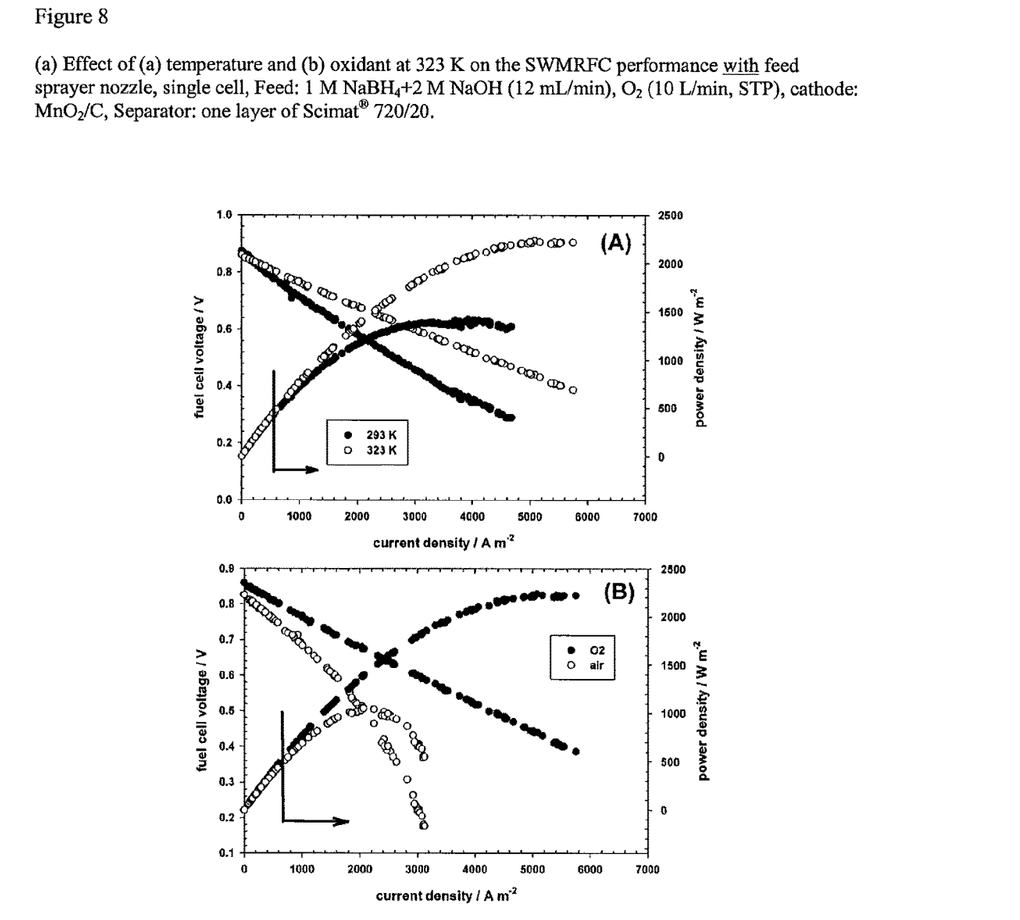
FIG. 8 is a graph showing the effect of temperature (A) and oxidant (B) on the Swiss-roll mixed reactant fuel cell electrochemical reactor with a feed sprayer nozzle.

As in Example 1 the flowing liquid fuel and gas oxidant were mixed at a T junction, but in this case the two-phase mixture was passed through a spray nozzle inside the reactor, with its outlet located about 2 cm above the top face (inlet) of the coiled cell. Again a Pt/C anode catalyst was coupled with an $MnO_2$/C cathode catalyst, and operated under the same conditions as in Example 1. FIG. 8 shows performance curves for this reactor at 323 K, giving a maximum superficial power density of about 2250 W/m².

Figure 9:
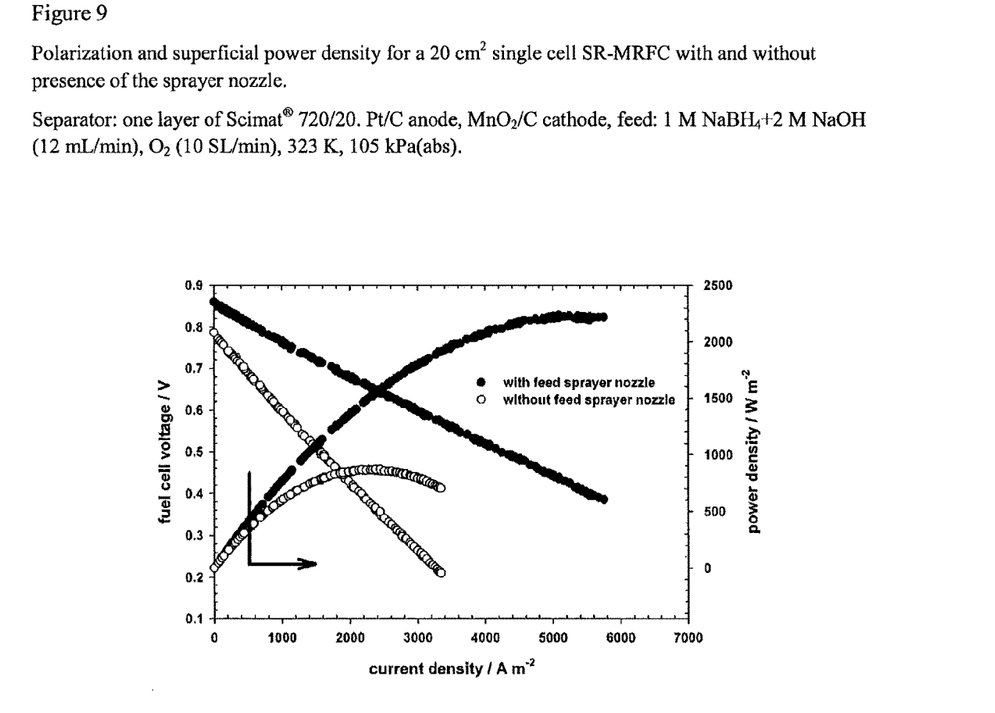
FIG. 9 is a graph showing the polarization and superficial power density for a Swiss-roll mixed reactant fuel cell electrochemical reactor with and without the presence of a sprayer nozzle.

The performance of SRMRFC with and without utilizing the feed sprayer nozzle is compared in FIG. 9. As shown in FIG. 9, higher open circuit potential and also the 3 fold increase in maximum superficial power density from Example 1 to Example 2 is attributed to the use of the feed spray nozzle, which distributes the fuel more uniformly over the anode and facilitates access of the oxidant gas to the cathode of the SRMRFC. This uniform distribution of fuel and oxidant also suppresses flooding and mixed-potential on the cathode. Except for the presence and absence of the sprayer feed nozzle, all other operating and reactor conditions were kept constant for FIG. 9.

Example 3

Figure 10:
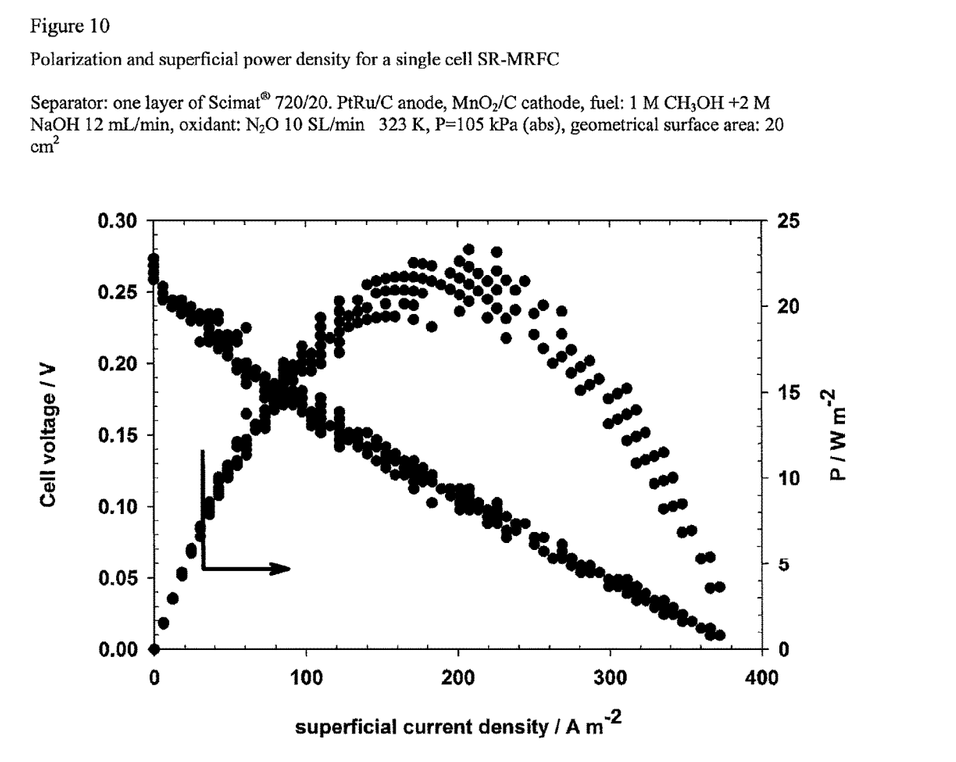
FIG. 10 is a graph showing the polarization and superficial power density for a Swiss-roll mixed reactant fuel cell electrochemical reactor with a sprayer nozzle.

A SRMRFC reactor was set up and operated with a feed sprayer nozzle as in Example 2, except that in this case the fuel and oxidant were respectively a solution of [1M methanol with 2 M NaOH] and nitrous oxide ($N_2O$) gas. FIG. 10 shows the reactor performance curves for Example 3, with a peak superficial power density of 22 $Wm^{-2}$ at 200 $Am^{-2}$.

Example 4

A SRMRFC reactor was set up as in FIG. 11, for bipolar operation with both 2 and 3 of the single cells of Examples 1 and 2 connected in series with respect to both electric current and fluid flow. As shown in FIG. 11 and discussed above, an important aspect of this bipolar configuration is that the individual cells 1, 2 and 3 are connected electronically to each other via the central mandrel and outer pipe, but are ionically insulated from each other by an open space in which the ionically conductive electrolyte liquid is present as a discontinuous dispersion in the flowing (non-conductive) gas.

Note also that while the three "cells" of Example 4 were spooled single cells (as in FIG. 1), the cells in FIG. 11 may be either spooled single cells or spooled bipolar cell stacks (as in FIG. 2).

Figure 12:
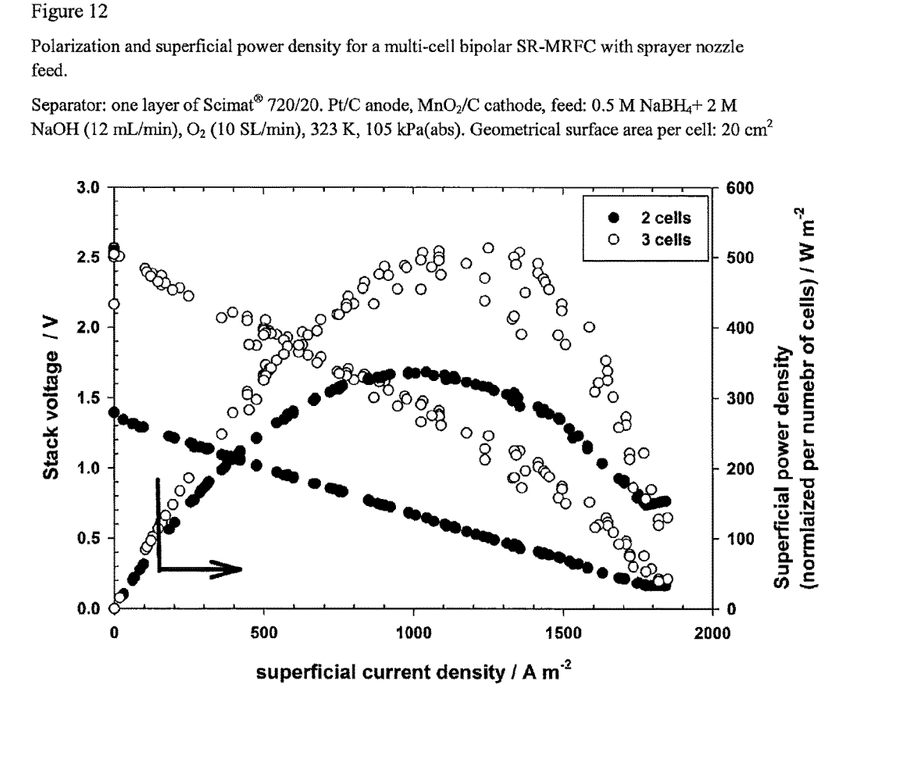
FIG. 12 is a graph showing the polarization and superficial power density for a bipolar Swiss-roll mixed reactant fuel cell electrochemical reactor with sprayer feed nozzle.

In the present case the fuel and oxidant were respectively [0.5 M $NaBH_4$ with 2 M NaOH] liquid solution and oxygen gas. FIG. 12 shows the bipolar reactor performance with spooled single cells, in which 3 cells in series gave a peak power output of about 2 W.

While specific examples are provided above, it is understood that the teachings of the invention apply to other reactors as discussed above. In its practical application an important aspect of the invention concerns the design of the integrated system of the dispersion device with a given electrochemical reactor. This is due to the fact that the conditions of the reactant dispersion affect the performance of the reactor. Hence one skilled in the art will understand that the design of a given reactor incorporating a dispersion device should account for such factors as the reactant flow rate(s), phase volume ratio, interfacial tension and droplet diameter(s), along with the pressure and temperature change across the dispersion device, distance of the dispersing device from the reaction zone and the suppression of droplet coalescence in relation to the path of the reactant dispersion through the reactor. These things are relevant with respect to the reactant distribution, mass transfer rates, temperature profile, parasitic power consumption and other factors that determine the performance of continuous electrochemical reactors.

While the invention has been particularly shown and described with reference to the preferred embodiments thereof, it will be understood by those skilled in the art that various changes in form and details may be made without departing from the scope of the invention.

What is claimed is:

1. A method of operating a continuous mixed reactant fuel cell reactor or a continuous Swiss roll mixed reactant fuel cell reactor, having an electrochemical reaction zone, the method comprising the step of dispersing a liquid reactant in a gas or liquid as it enters said electrochemical reaction zone of the reactor.

2. The method of claim 1 wherein said method comprising dispersing said liquid reactant in said gas to form a spray or mist, said spray or mist entering said electrochemical reaction zone of the reactor.

3. The method of claim 1 wherein said reactor comprises a continuous Swiss-roll mixed reactant fuel cell reactor, the method comprising the step of dispersing said liquid reactant in said gas to form a spray or mist, said spray or mist entering said electrochemical reaction zone of said reactor.

4. The method of claim 3 in which the volumetric gas to liquid feed ratio of said gas and said liquid reactant is in the range of 10 to 1000.

5. The method of claim 1 wherein said reactor comprises a continuous Swiss-roll mixed reactant fuel cell reactor, and wherein said gas and said liquid are immiscible with said liquid reactant such that when said liquid reactant is dispersed in said gas or said liquid an emulsion is formed, said emulsion entering said electrochemical reaction zone of said reactor.

6. The method of claim 1 wherein said electrochemical reactor is a multi-cell reactor.

7. The method of claim 6 wherein said multi-cell reactor comprises either single cells, monopolar cell stacks, or bipolar cell stacks with adjacent single cells, monopolar cell stacks or bipolar cell stacks respectively.

8. The method of claim 6 wherein said multi-cell reactor has an electrode arrangement comprising:
   at least two sandwich arrangements, each sandwich arrangement comprising at least two deformable electrodes, first insulating means for preventing electronic contact between said at least two electrodes and second insulating means for preventing electronic contact between one of said at least two deformable electrodes and other conducting parts of said reactor,
   said at least two sandwich arrangements being rolled around an axis in spaced separation from one another inside an electronically conductive cylinder; and
   wherein said axis and said cylinder are both longitudinally segmented by electronic insulators to allow for bipolar operation of cells of said reactor.

9. An apparatus for operating a continuous mixed reactant fuel cell reactor or a continuous Swiss roll mixed reactant fuel cell reactor that includes a dispersal device for dispersing a liquid reactant in either a gas to form a spray or mist, or in a liquid to form an emulsion, said spray, mist or emulsion being fed into an electrochemical reaction zone of said reactor.

10. The apparatus of claim 9 wherein said dispersal device comprises a spray nozzle, a mixing nozzle or an in-line mixer.

* * * * *